United States Patent
Ortiz (10) Patent No.: US 11,351,921 B2
(45) Date of Patent: Jun. 7, 2022

(54) VEHICLE ROOF ACCESS DEVICE

(71) Applicant: Toyota Motor Engineering & Manufacturing North America, Inc., Plano, TX (US)

(72) Inventor: Matthew D. Ortiz, Belleville, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/070,255

(22) Filed: Oct. 14, 2020

(65) Prior Publication Data

US 2022/0111795 A1 Apr. 14, 2022

(51) Int. Cl.
*B60R 3/00* (2006.01)

(52) U.S. Cl.
CPC .................. *B60R 3/005* (2013.01)

(58) Field of Classification Search
CPC ........... B60R 3/005; B60R 3/007; B60R 3/02; A47C 7/5062
See application file for complete search history.

(56) References Cited

U.S. PATENT DOCUMENTS

| | | | | | |
|---|---|---|---|---|---|
| 3,224,525 | A | * | 12/1965 | Letzel | B62D 33/067 180/89.19 |
| 3,784,227 | A | * | 1/1974 | Rogge | B60R 3/02 280/166 |
| 4,556,125 | A | * | 12/1985 | Johnson | B60R 3/02 182/91 |
| 4,626,016 | A | * | 12/1986 | Bergsten | B60N 3/02 105/354 |
| 5,474,353 | A | * | 12/1995 | Koester | B60N 2/062 296/65.07 |
| 7,318,616 | B1 | * | 1/2008 | Bradley | B60N 2/206 296/37.15 |
| 7,611,183 | B2 | * | 11/2009 | Burkey | B60N 2/206 296/37.15 |
| 7,621,599 | B2 | * | 11/2009 | Whalen | A47C 7/50 297/423.21 |
| 7,841,609 | B2 | * | 11/2010 | Okada | B60R 3/02 280/166 |
| 7,866,723 | B2 | * | 1/2011 | Ninio | B60N 3/063 296/65.11 |

(Continued)

FOREIGN PATENT DOCUMENTS

EP 3659864 A1 10/2006
JP H11240386 A 9/1999

*Primary Examiner* — Jeffrey J Restifo
(74) *Attorney, Agent, or Firm* — Snell & Wilmer LLP (57) ABSTRACT

An apparatus for enabling a user to access a roof of the vehicle and methods of using the same. The apparatus may be positioned within a slot located in a vehicle seat. A housing having an open end may define the slot. The apparatus may include a plate having a proximal end, a distal end, and a first stepping surface. The plate may be movable via a sliding mechanism between a stored position where the plate is positioned within the slot, and an extended position where the proximal end extends out of the vehicle and is horizontal to allow the user to step on the first stepping surface to access the roof. The plate may be rotated to be vertical such that the distal end faces up and defines a second stepping surface with increased elevation.

20 Claims, 10 Drawing Sheets

(56) References Cited

U.S. PATENT DOCUMENTS

| | | | |
|---|---|---|---|
| 7,918,508 B2* | 4/2011 | Whalen | A47C 7/50 |
| | | | 297/423.26 |
| 7,934,737 B2* | 5/2011 | Okada | B60R 3/02 |
| | | | 280/166 |
| 9,073,486 B1* | 7/2015 | Meszaros | B60R 3/02 |
| 9,302,719 B1* | 4/2016 | Krishnan | B62D 33/0273 |
| 9,802,545 B1* | 10/2017 | Salter | B60Q 1/0023 |
| 9,902,327 B1* | 2/2018 | Singh | B60R 3/002 |
| 10,106,086 B1* | 10/2018 | Eckstein | B60R 3/005 |
| 10,106,088 B2 | 10/2018 | Smith | |
| 10,195,968 B2 | 2/2019 | Barnes | |
| 10,618,472 B2 | 4/2020 | Du et al. | |
| 10,625,680 B1* | 4/2020 | Koehler | B60R 11/00 |
| 10,723,273 B1* | 7/2020 | Gray | B60R 3/02 |
| 2003/0127285 A1 | 7/2003 | Claeys | |
| 2008/0238020 A1* | 10/2008 | Okada | B60R 3/02 |
| | | | 280/166 |
| 2010/0019468 A1* | 1/2010 | Price | B60R 3/02 |
| | | | 280/165 |
| 2010/0231011 A1* | 9/2010 | Lindsay | B60R 7/02 |
| | | | 297/188.11 |
| 2012/0139206 A1 | 7/2012 | May | |
| 2015/0224935 A1* | 8/2015 | Huebner | B60R 3/02 |
| | | | 280/166 |
| 2016/0137134 A1* | 5/2016 | Nania | B60R 3/02 |
| | | | 280/164.1 |
| 2016/0152188 A1* | 6/2016 | Handschke | B60R 3/02 |
| | | | 280/166 |
| 2018/0228118 A1* | 8/2018 | Murray | A01K 1/0272 |
| 2018/0228121 A1* | 8/2018 | Murray | A47B 88/40 |
| 2018/0281686 A1* | 10/2018 | Eckstein | B62D 25/04 |
| 2018/0290596 A1* | 10/2018 | Fukushima | B60R 9/0423 |
| 2019/0037799 A1* | 2/2019 | Murray | B60R 3/02 |
| 2019/0126872 A1* | 5/2019 | Hatch | B60R 19/24 |
| 2019/0275952 A1* | 9/2019 | Bennett | B60R 11/00 |
| 2019/0389386 A1* | 12/2019 | Meszaros | B60R 3/002 |
| 2021/0086702 A1* | 3/2021 | Christensen | B60N 3/02 |

* cited by examiner

VEHICLE ROOF ACCESS DEVICE

BACKGROUND

1. Field

The present disclosure is directed to a roof access device for a vehicle and methods of using the same.

2. Description of the Related Art

Users (e.g., drivers and/or passengers) of vehicles may need to access the roof of their vehicle for various reasons, such as, cleaning or washing the roof of the vehicle, attaching a roof rack to the roof of the vehicle, securing or removing bicycles, skis or luggage to and from the roof rack or the roof of the vehicle, etc. The roof (or the top) of a vehicle is often difficult to reach due to its distance from the ground. Additionally, shorter users may generally have difficulty reaching the roof (or the top) of the vehicle.

Side steps and rock guards, if installed, may only provide enough elevation for users to access the cabin but not the roof of the vehicle. Sometimes, users use a ladder to access the roof. In order to access the roof of the vehicle, the ladder will need to be positioned in close proximity to the vehicle; however, the ladder will also generally need to be held by another person in order to make sure it doesn't tip over. This may not be possible since users are sometimes alone and unable to find someone to hold the ladder in place. Furthermore, ladders may not be conveniently available, especially when the user is not at home where a ladder is generally stored. Quite often, the user is instead on the road, and thus accessing the roof of the vehicle or other items on the roof is difficult and cumbersome.

Therefore, there is a need for a roof access device for a vehicle.

SUMMARY

A roof access device for a vehicle and methods of using the same are disclosed herein. The roof access device may include a plate stored in a slot located in a seat of the vehicle and extended out of the slot and the vehicle horizontally when to be used as a step to access the roof of the vehicle. The plate may be rotated up such that its vertical to increase the height of the plate.

In accordance with an embodiment of the present disclosure, there may be an apparatus for enabling a user to access a roof of the vehicle. The apparatus may be positioned within a slot located in a seat of the vehicle. The apparatus may have a housing. The housing may have an open end, a left wall, and a right wall. The housing may define the slot. The apparatus may have a left track and a right track. The left track may extend along a length of the left wall. The right track may extend along a length of the right wall. The apparatus may have a plate. The plate may have a proximal end, a left side surface, a right side surface, and a stepping surface. The apparatus may have a left rail extending along a length of the left side surface. The apparatus may have a right rail extending along a length of the right side surface. The left rail may be slidably engaged with the left track. The right rail may be slidably engaged with the right track. The plate may be movable between a stored position and an extended position. In the stored position, the plate may be positioned within the slot. In the extended position, the proximal end may extend out of the vehicle and the stepping surface may be configured to be horizontal to allow the user to place the user's foot on the stepping surface for accessing the roof.

The sliding of the left and right rails on the left and right tracks may be actuated by a motor. The proximal end may have a notch sized and shaped to fit a finger or a tab sized and shaped to engage with a finger to allow the user's finger to move the plate between the stored position and the extended position. The stepping surface may be a rubber pad to allow the user's foot to have an improved grip. The rubber pad may have a plurality of protrusions to allow the user's foot to have an improved grip. The open end of the house may be coverable with a cover in the stored position. The left and right tracks may be outer tracks and the apparatus may further have left and right inner tracks slidably engaged with the left and right outer tracks and the left and right rails. The left and right inner tracks may extend out of the slot in the extended position to increase the distance between the proximal end and the open end.

In accordance with an embodiment of the present disclosure, there may be an apparatus for enabling a user to access a roof of the vehicle. The apparatus may be positioned within a slot located in a seat of the vehicle. The apparatus may have a housing. The housing may have an open end, a left wall, and a right wall. The housing may define the slot. The apparatus may have a left track and a right track. The left track may extend along a length of the left wall. The right track may extend along a length of the right wall. The apparatus may have a left rail and a right rail. The left rail may be slidably engaged with the left track. The right rail may be slidably engaged with the right track. The left and right rails may be configured to slide out of the open end. The apparatus may have a plate having a proximal end, a distal end, a right side surface, and a top surface. The plate may be rotatably attached to the left rail from the left side surface and the right rail from the right side surface. The plate may be movable between a stored position, a first extended position, and a second extended position. In the stored position, the plate may be positioned within the slot. In the first extended position, the proximal end may extend out of the vehicle and the top surface may be configured to be horizontal to allow the user to place the user's foot on the top surface for accessing the roof. In the second extended position, the plate may be rotated about the left and right rails such that the distal end faces up and is horizontal to allow the user to place the user's foot on the distal end for accessing the roof at an increased elevation relative to the first extended position.

The sliding of the left and right rails on the track may be actuated by a motor. The rotation of the plate from the first extended position to the second extended position may be actuated by a motor. The proximal end may have a notch sized and shaped to fit a finger or a tab sized and shaped to engage with a finger to allow the user's finger to move the plate between the stored position and the first extended position.

The top surface may be a rubber pad to allow the user's foot to have an improved grip in the first extended position. The rubber pad may have a plurality of protrusions to allow the user's foot to have an improved grip in the first extended position. The distal end may have a rubber pad to allow the user's foot to have an improved grip in the second extended position. The rubber pad may have a plurality of protrusions to allow the user's foot to have an improved grip in the second extended position. The open end of the housing may be coverable with a cover in the stored position.

The left and right tracks may be outer tracks and the apparatus may further have left and right inner tracks slidably engaged with the left and right outer tracks and the left and right rails. The left and right inner tracks may extend out of the slot in the first and second extended positions to increase the distance between the proximal end and the open end.

In accordance with an embodiment of the present disclosure, there may be a method of using an apparatus for enabling a user to access a roof of a vehicle. The method may include pulling a plate out of a housing defining a slot located in a seat of the vehicle by sliding the left and right rails attached to the left and right side surfaces of the plate on the left and right tracks. The left and right tracks may extend along lengths of the left and right walls of the housing. Pulling the plate may include engaging the user's finger with a notch or a tab on the proximal end. The method may include extending the plate out of the vehicle such that a top surface of the plate is horizontal to allow the user to place the user's foot on the top surface for accessing the roof. The method may include rotating the plate about the left and right rails such that a distal end of the plate faces up and is horizontal to allow the user to place the user's foot on the distal end for accessing the roof. This orientation may increase the elevation of the user relative to when the top surface is horizontal.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

The apparatus and systems described herein enable users (e.g., drivers, passengers, friends, neighbors, etc.) to have convenient, easy and safe access to the roof of a vehicle. Users of vehicles may need to access the roof of a vehicle for various reasons, such as, cleaning or washing the roof of the vehicle, attaching a roof rack to the roof of the vehicle, securing or removing bicycles, skis or luggage to and from the roof rack or the roof of the vehicle, etc. The apparatus and/or systems described herein advantageously provides a built-in, retractable, and compact step or plate that is stored in a seat of the vehicle. The step or plate is movable or slidable between a stored or closed position and an extended or open position. The step or plate is rotatable ninety (90) degrees to be longitudinally taller and provide a higher reach for its user. In the stored or closed position, the step or plate is positioned within the seat and allows the vehicle door to open and close. In the extended or open position, the step or plate allows the user's foot to be placed thereon and allows the user to have improved and convenient access to the roof of the vehicle. The vehicle door needs to be opened in order to access and allow use of the step or plate. When the vehicle door is open, the user can manually or automatically pull the step or plate out of the vehicle past a frame of the door so that the user can place the user's foot thereon to access the roof of the vehicle. The step or plate may be manually or automatically pushed back into its housing in the seat once it's not needed. Once the step or plate is back in the stored or clos ed position, the vehicle door can then be closed.

Figure 1:
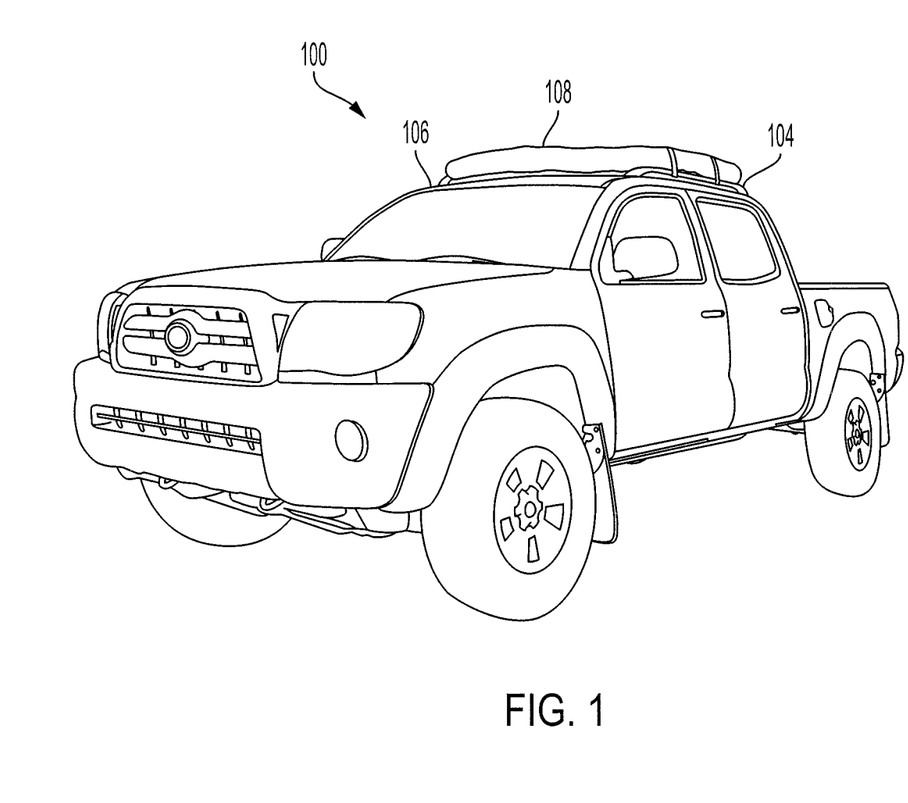
FIG. 1 illustrates a perspective view of a vehicle having the roof access device according to an aspect of the present disclosure.
Figure 2:
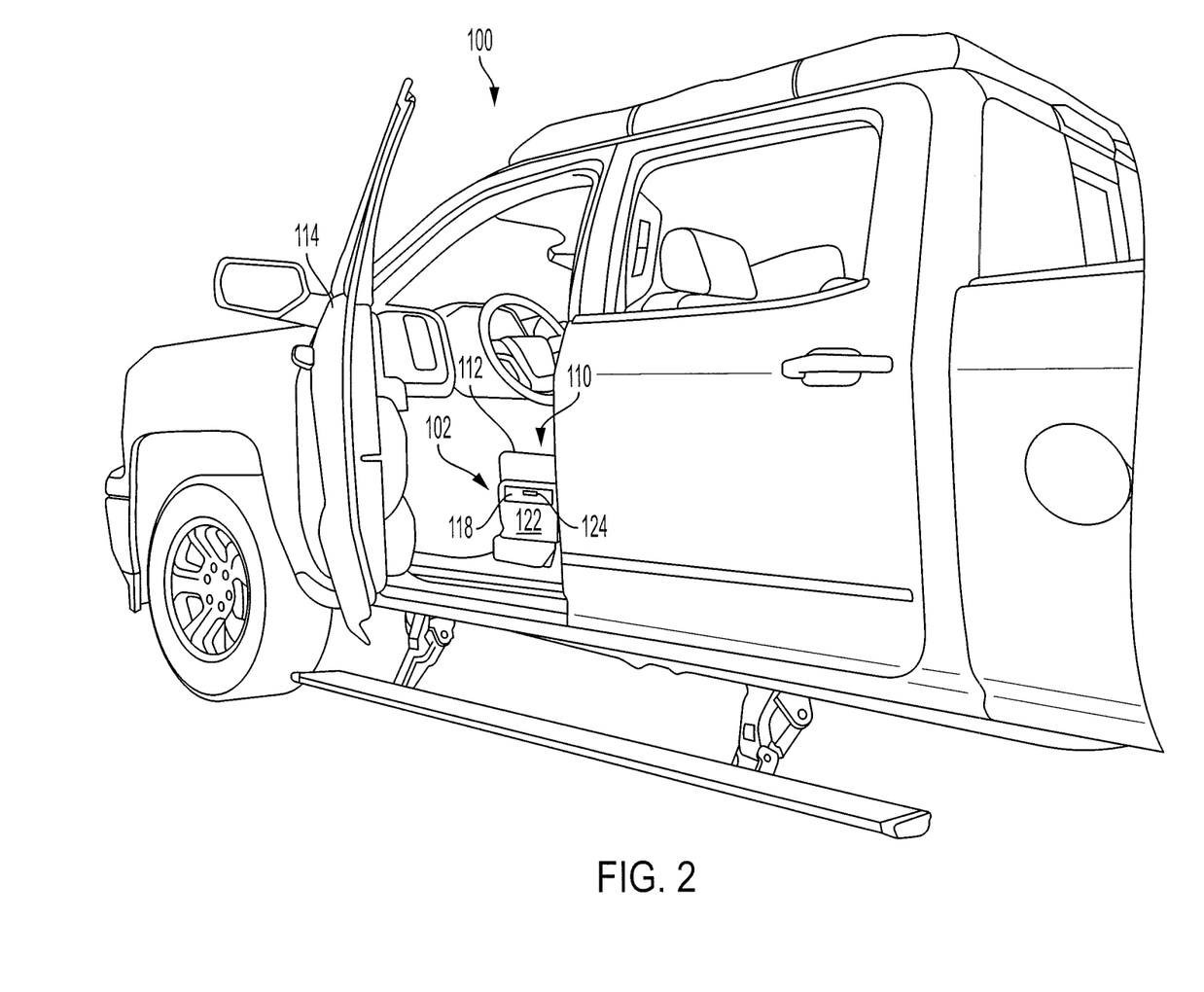
FIG. 2 illustrates a perspective view of the roof access device of the vehicle shown in FIG. 1 in a stored position according to an aspect of the present disclosure.
Figure 6:
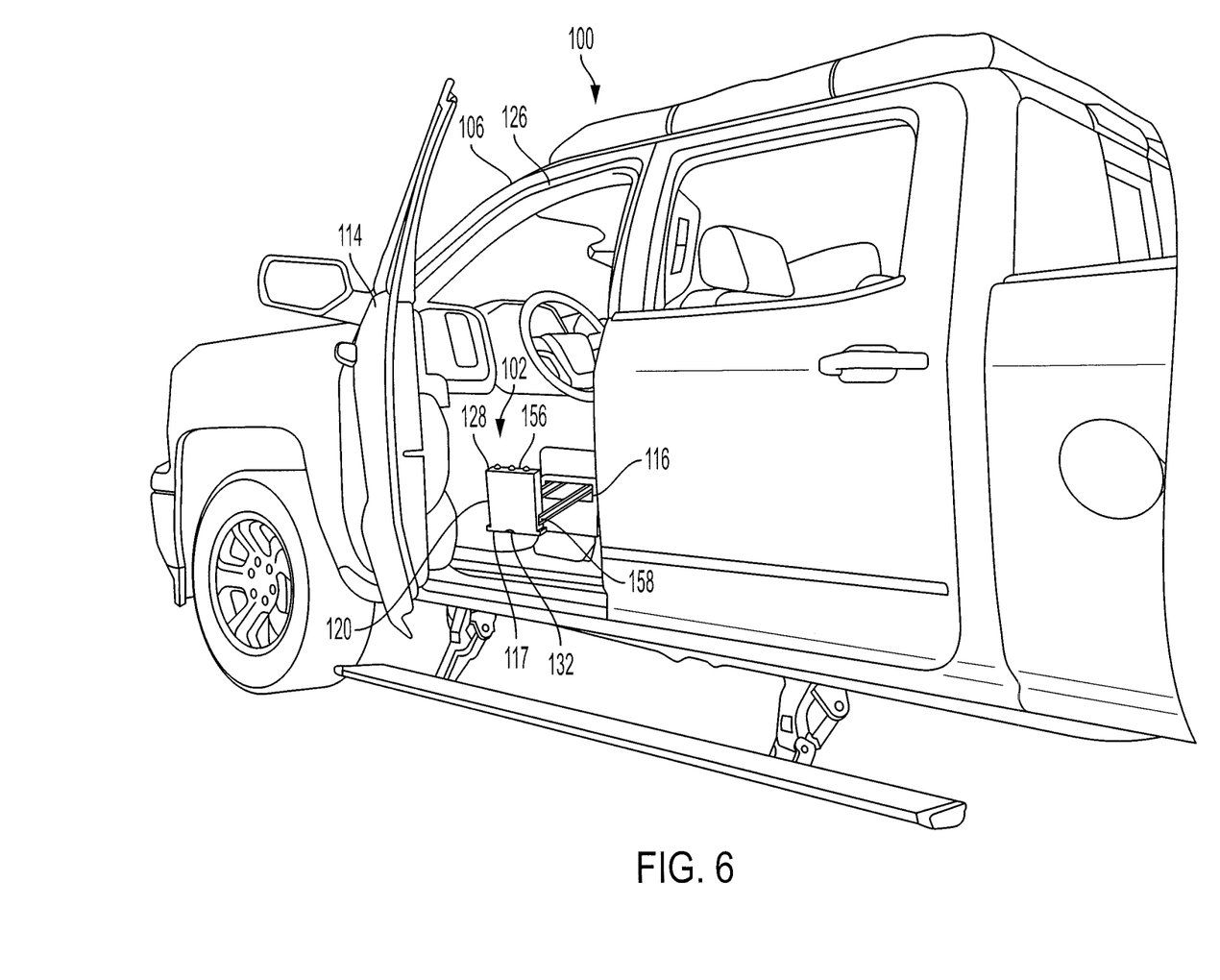
FIG. 6 illustrates a perspective view of the roof access device shown in FIG. 2 in an extended position according to an aspect of the present disclosure.

FIG. 1 illustrates a perspective view of a vehicle 100 having the roof access device 102 (see FIG. 2) according to an aspect of the present disclosure. The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIGS. 1, 2, and 6 depict a pickup truck by example. The vehicle 100 may have a roof rack 104 on its roof 106. The roof rack 104 may have cargo 108 attached to it. For example, the cargo 108 may be stored in a box, a basket, or a fabric sleeve attached to the roof rack 104. The cargo 108 may also be directly fastened to the roof rack 104. The cargo 108 may require a separate carrier apparatus to be attached to the roof rack 104 to carry non-flat items, such as a bicycle or a motorbike.

FIG. 2 illustrates a perspective view of the roof access device 102 of the vehicle 100 in a stored position according to an aspect of the present disclosure. The roof access device 102 may be located in a seat 110 of the vehicle 100. In some embodiments, the seat 110 may be a front driver seat as shown in FIG. 2. In some embodiments, the seat 110 may be a passenger seat or a back seat. The roof access device 102 may be located below a seat cushion 112. The roof access device 102 may be located in the seat 110 such that it faces a door 114 of the vehicle 100. The roof access device 102 may have a slot or a housing 116 (see FIG. 3) in the seat 110. The housing 116 may have a cover 118. The cover 118 may conceal a step or a panel 120 (see FIG. 3) when the roof access device 102 may be in the stored position. The cover 118 may be flush with an outer surface 122 of the seat 110 when closed. The cover 118 may have a protrusion or a cavity 124 sized and shaped to allow a user to open the cover 118 by engaging a finger to pull the cover 118. In some embodiments, the cover 118 may be opened automatically. For example, the cover 118 may be opened with a motor or pushed out by an automatically extending step 120. In some embodiments, the roof access device 102 may not have a cover (see FIG. 7). In such embodiments, the proximal end 117 (see FIG. 7) may be flush with the outer surface 122 of the seat 110 in a stored position.

Figure 3:
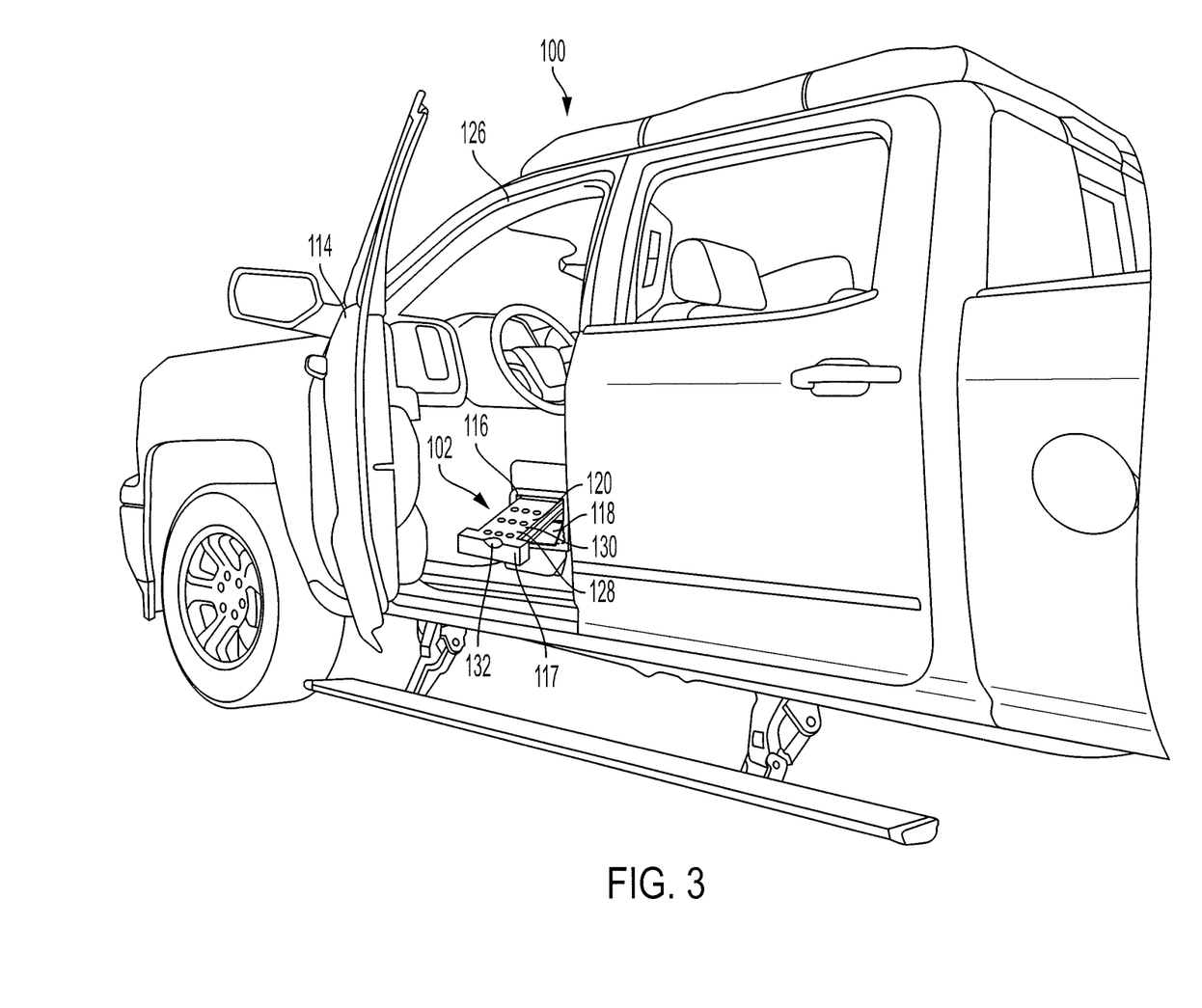
FIG. 3 illustrates a perspective view of the roof access device shown in FIG. 2 in an extended position according to an aspect of the present disclosure.

FIG. 3 illustrates a perspective view of the roof access device 102 in an extended position according to an aspect of the present disclosure. In the extended position, the step 120 may extend out of the housing 116 and the vehicle 100 through a frame 126 of the door 114. The step 120 may be made from wood, plastic, or metal. The step 120 may have a stepping surface 128. The roof access device 102 may sustain up to 300 lb of load acting down on the stepping surface 128. In some embodiments, the stepping surface 128 may be a top surface 130 of the step 120 as shown in FIG. 3. The step 120 may be pulled out of the housing 116 via a sliding mechanism. The sliding mechanism may be actuated manually by pulling the step 120 from a proximal end 117. The proximal end 117 may have a protrusion (e.g., a tab) or a cavity (e.g., a notch) 132 sized and shaped to allow a user to slide the step 120 by engaging a finger to pull the step 120. In some embodiments, the sliding mechanism may be actuated by pushing the step 120 into the housing 116 to release a clip, which may activate a spring and gear system to slide out the step 120 from the housing 116. As such, the sliding mechanism may be activated under the same principles as a push-to-open vehicle fuel door. Alternatively, the sliding mechanism may be actuated automatically. The sliding mechanism may be in electrical communication with a motor that is controllable via an input such as a button, a touch or a motion sensor, and a voice command.

Figure 4:
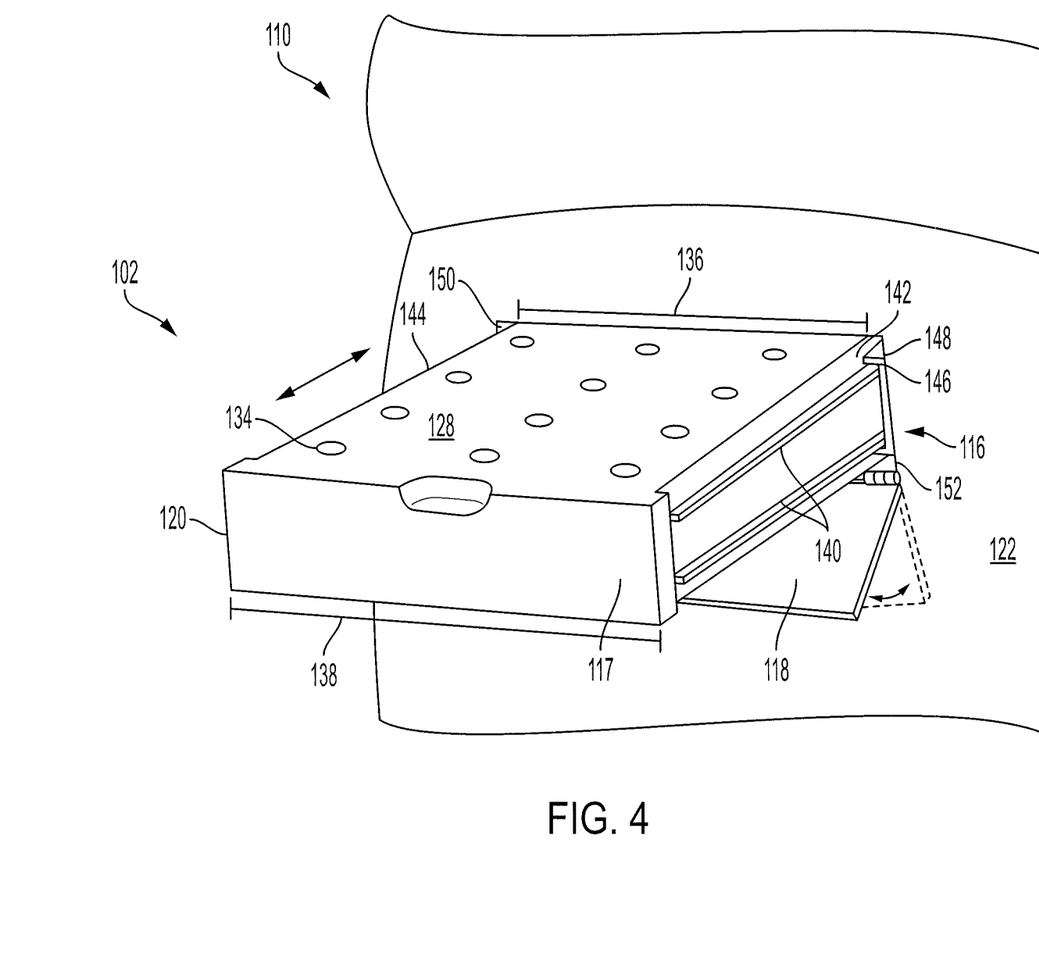
FIG. 4 illustrates a close-up perspective view of the roof access device shown in FIG. 3 according to an aspect of the present disclosure.

FIG. 4 illustrates a close-up perspective view of the roof access device 102 in the extended position according to an aspect of the present disclosure. The stepping surface 128 may be made of an abrasion and slip resistant material. For example, the stepping surface 128 may be rubber. The stepping surface 128 may have a plurality of protrusions 134 to further improve grip. The housing 116 may be dimensioned to provide clearance for the protrusions 134. The step 120 may have a first width 136. The width 136 may be between 2 inches to 20 inches. Preferably, the width 136 may be between 4 inches to 14 inches. More preferably, the width 136 may be between 6 inches to 12 inches. The step 120 may have a second width 138 measured along the proximal end 117. The width 138 may be ⅛ inch to 2 inches greater than the width 136. Preferably, the width 138 may be ⅛ inch to 1 inch greater than the width 136. More preferably, the width 138 may be ⅛ inch to ½ inch greater than the width 136. The width difference may accommodate rails 140 attached to left and right sides 142, 144 of the step 120.

The rails 140 may be slidably engaged with tracks 146 attached to left and right walls 148, 150 of the housing 116. The tracks 146 may be distanced from an open end 152 of the housing 116. The distancing may allow for the cover 118 to be flush with the open end 152 and the outer surface 122 of the seat 110 when the step 120 is in stored position. The sliding may be guided by a variety of techniques that would be appreciated by one of ordinary skill in the art. For example, the rails 140 may be guided by wheels, ball bearings, or magnets.

The cover 118 may be hinged from under the housing 116 and rotated down as shown in FIG. 4 to not interfere with the sliding path of the step 120. The cover 118 may rest against the outer surface 122 of the seat 110. The cover 118 may be locked in place in an open position to prevent unwanted movement. For example, the cover 118 may be fastened to the outer surface 122 by engaging the protrusion or cavity 124 (see FIG. 2) with a hole or a protrusion of the outer surface 122, respectively. In some embodiments, the cover 118 may be hinged from above the housing 116 and rotated up to not interfere with the sliding path of the step 120. In some embodiments, the cover 118 may slide laterally in either direction along the open end 152. In some embodiments, the cover 118 may rotate up or down and slide into the housing 116.

Figure 5:
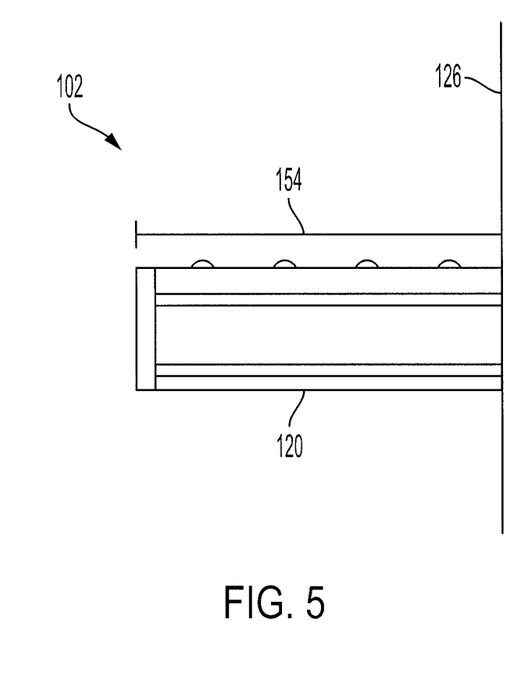
FIG. 5 illustrates a close-up side view of the roof access device shown in FIG. 3 according to an aspect of the present disclosure.

FIG. 5 illustrates a close-up side view of the roof access device 102 according to an aspect of the present disclosure. The step 120 may extend out of the door frame 126 by a distance 154. The distance 154 may be between 2 inches to 24 inches. Preferably, the distance 154 may be between 4 inches to 12 inches. More preferably, the distance 154 may be between 6 inches to 10 inches.

FIG. 6 illustrates a perspective view of the roof access device 102 in an extended position according to an aspect of the present disclosure. In the extended position, the step 120 may extend out of the housing 116 and the vehicle 100 through a frame 126 of the door 114. The step 120 may be pulled out of the housing 116 via a sliding mechanism. The step 120 may then be rotated from a lengthwise horizontal position to a lengthwise vertical position. In the vertical position, a distal end 156 of the step 120 may face up. The distal end 156 may have a stepping surface 128. The distal end 156 being the stepping surface 128 when the step 120 is vertical may provide greater elevation when accessing the roof 106 relative to the top surface 130 (see FIG. 3) being the stepping surface 128 when the step 120 is horizontal. The roof access device 102 may sustain up to 300 lb of load acting down on the stepping surface 128. In some embodiments, the proximal end 117 may be the stepping surface 128. In such embodiments, the step 120 may be rotated down and then slid upward with respect to the sliding mechanism. The sliding mechanism may be actuated manually by pulling the step 120 from a proximal end 117. The proximal end 117 may have a protrusion (e.g., a tab) or a cavity (e.g., a notch) 132 sized and shaped to allow a user to slide the step 120 by engaging a finger to pull the step 120. In some embodiments, the sliding mechanism may be actuated by pushing the step 120 into the housing 116 to release a clip, which may activate a spring and gear system to slide out the step 120 from the housing 116. As such, the sliding mechanism may be activated under the same principles as a push-to-open vehicle fuel door. Alternatively, the sliding mechanism may be actuated automatically. The sliding mechanism may be in electrical communication with a motor that is controllable via an input such as a button, a touch or a motion sensor, and a voice command.

The step 120 may be rotatably engaged with the sliding mechanism. The rotation may be carried out manually by disengaging the step 120 from one end and rotating the step 120 upward by approximately ninety (90) degrees. Alternatively, the rotation may be automated. The step 120 may be rotated at pivot joints 158 actuatable by one or more gears in electrical communication with a motor that is controllable via an input such as a button, a touch or a motion sensor, and a voice command.

Figure 7:
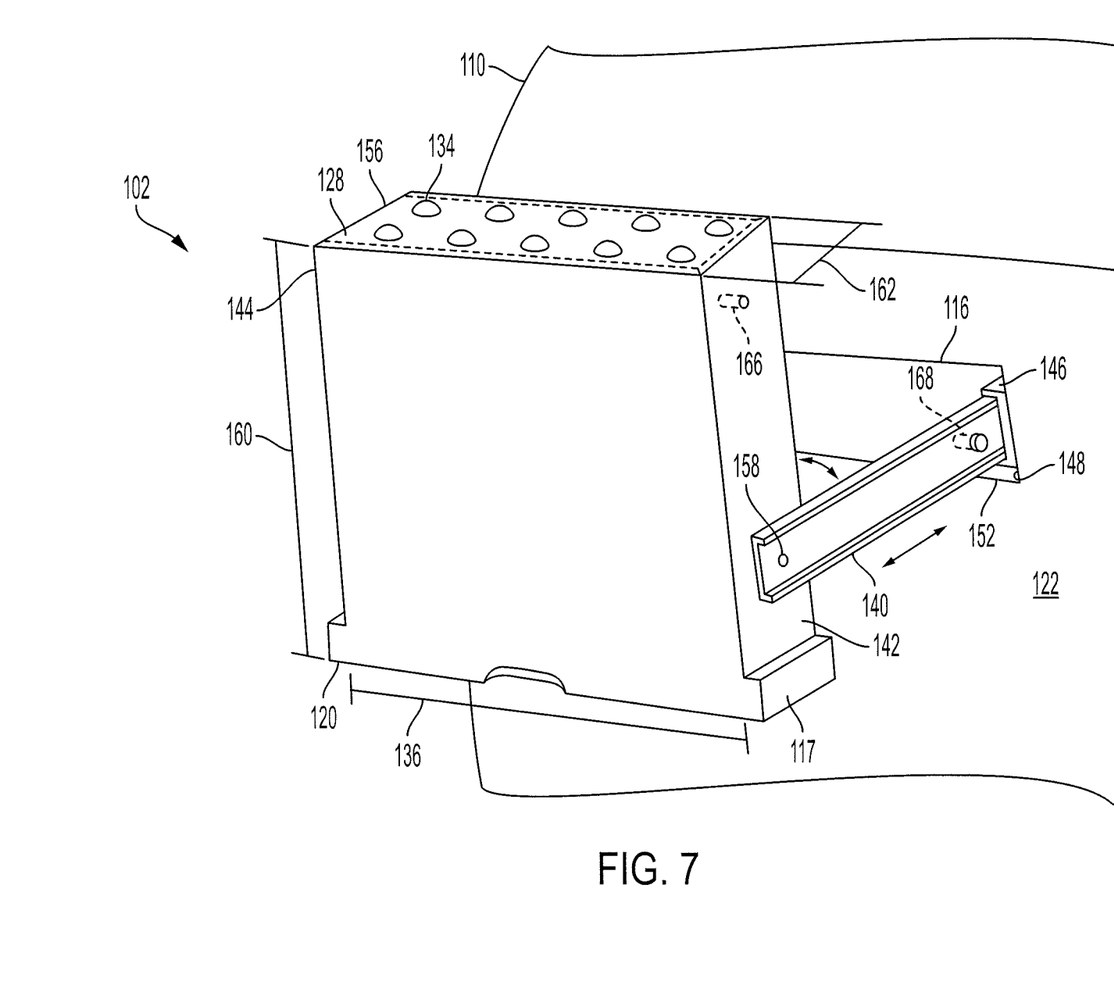
FIG. 7 illustrates a close-up perspective view of the roof access device shown in FIG. 6 according to an aspect of the present disclosure.

FIG. 7 illustrates a close-up perspective view of the roof access device 102 according to an aspect of the present disclosure. The stepping surface 128 on the distal end 156 may be made of an abrasion and slip resistant material. For example, the stepping surface 128 may be rubber. The stepping surface 128 may have a plurality of protrusions 134 to further improve grip. The housing 116 may be dimensioned to provide clearance for the protrusions 134. The step 120 may have a length 160. The length 160 may be between 2 inches to 20 inches. Preferably, the length 160 may be between 4 inches to 14 inches. More preferably, the length 160 may be between 6 inches to 12 inches. The length 160 may be equal to the width 136. The step 120 may have a thickness 162. The thickness 162 may be between 1 inch to 24 inches. Preferably, the thickness 162 may be between 2 inches to 12 inches. More preferably, the thickness 162 may be between 4 inches to 6 inches.

The roof access device 102 may have a sliding mechanism including rails 140 that may be slidably engaged with tracks 146 attached to left and right walls 148, 150 of the housing 116. The rails 140 may be attached to the left and right sides 142, 144 of the step 120. On each of the left and right sides 142, 144, there may be the pivot joint 158 and a fixable joint 164 (see FIG. 9). On each side of the left and right sides 142, 144, the fixable joint 164 may include a hole 166 on the step 120 sized and shaped to receive a pin 168 located on the rail 140. In some embodiments, the holes 166 may be on the rails 140 and the pins 168 may be on the step 120. The pivot joints 158 may be proximal and the fixable joints 164 may be distal on the step 120. Each of the pins 168 may be removed from their respective holes 166 to rotate the step 120 to a vertical position. The removal of the pins 168 may be manual or automated. The pivot joints 158 may be locked so that the step 120 does not rotate further when the step 120 is in the vertical position. For example, a locking lever may adjust the frictional resistance of the pivot joints 158 to stop unwanted rotation.

The tracks 146 may be distanced from an open end 152 of the housing 116. The distancing may allow for the proximal end 117 to be flush with the open end 152 of the housing 116 and the outer surface 122 of the seat 110 when the step 120 is in the stored position. The sliding may be guided by a variety of techniques that would be appreciated by one of ordinary skill in the art. For example, the rails 140 may be guided by wheels, ball bearings, or magnets. In some embodiments, there may be a cover 118 (see FIGS. 2-4) that may cover the open end 152 of the housing 116 and be flush with the open end 152 and the outer surface 122 of the seat 110 when the step 120 is in the stored position. In such embodiments, the proximal end 117 of the step 120 may be within the housing 116 in the stored position.

Figure 8:
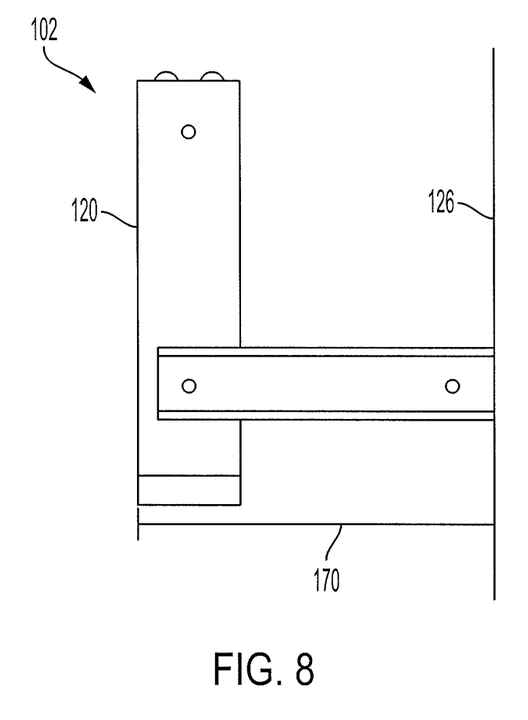
FIG. 8 illustrates a close-up side view of the roof access device shown in FIG. 6 according to an aspect of the present disclosure.

FIG. 8 illustrates a close-up side view of the roof access device 102 according to an aspect of the present disclosure. The step 120 may extend out of the door frame 126 by a distance 170. The distance 170 may be between 2 inches to 24 inches. Preferably, the distance 170 may be between 4 inches to 12 inches. More preferably, the distance 170 may be between 4 inches to 8 inches.

Figure 9:
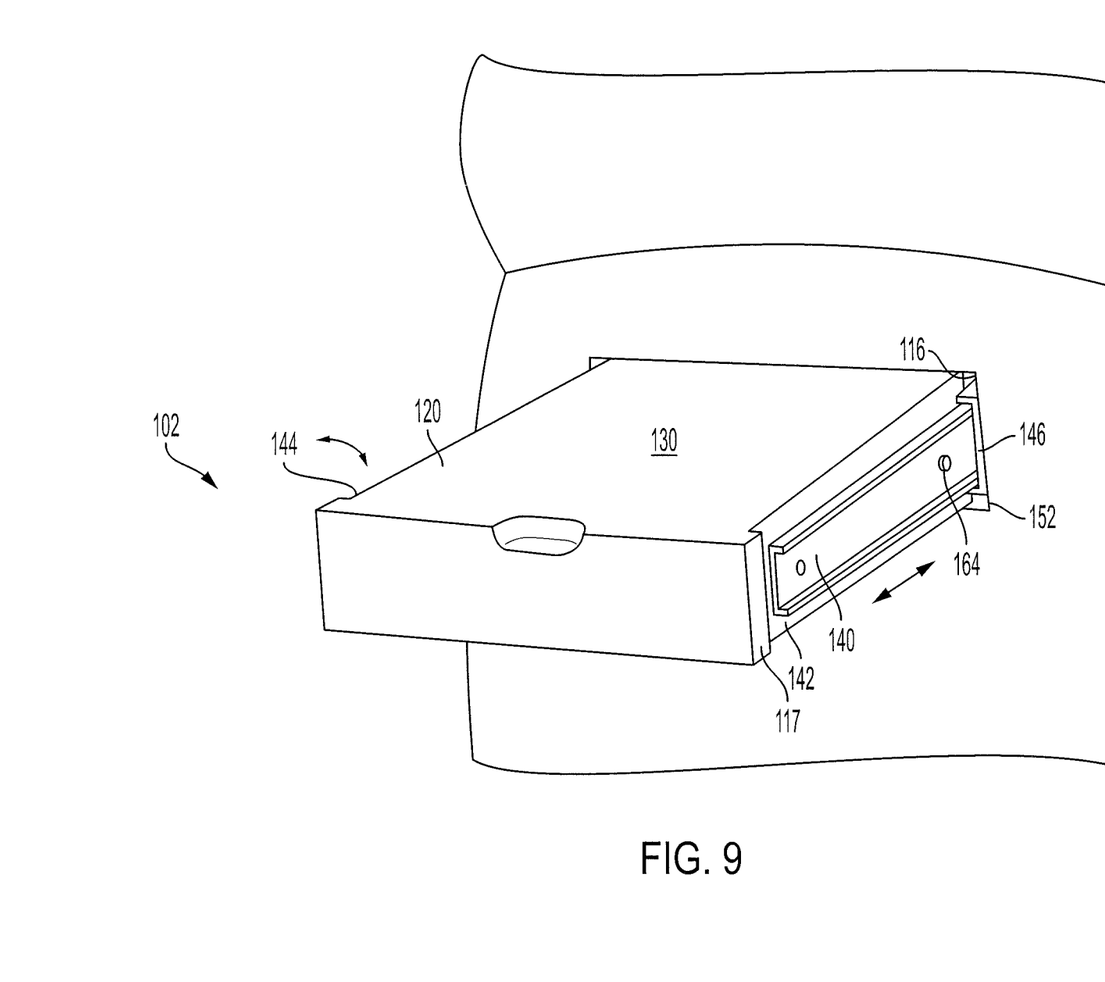
FIG. 9 illustrates a close-up perspective view of the roof access device shown in FIG. 6 in an extended position according to an aspect of the present disclosure.

FIG. 9 illustrates a close-up perspective view of the roof access device 102 in an extended position according to an aspect of the present disclosure. In this position, the step 120 may be brought back to a horizontal position slidable into the housing 116 for storage. The fixable joints 164 on each side of the left and right sides 142,144 may be fixed by engaging the holes 166 with the pins 168 (see FIGS. 7-8). The engagement may be manual or automated. The rails 140 may then slide on the tracks 146 and retract the step 120 into the housing 116 until the proximal end 117 is flush with the open end 152 in a coverless configuration or there is room for the cover 118 (see FIG. 2) to close into the housing 116 and be flush with the open end 152 in a covered configuration.

In some embodiments, the top surface 130 may also be a stepping surface 128 in addition to the distal end 156 (see FIG. 7) in the position shown in FIG. 9. In such embodiments, the roof access device 102 may be used with the step 120 in both the horizontal position and the vertical position.

The top surface 130 may be made of an abrasion and slip resistant material. For example, the top surface 130 may be rubber. The top surface 130 may have a plurality of protrusions 134 to further improve grip (see FIG. 4).

Figure 10:
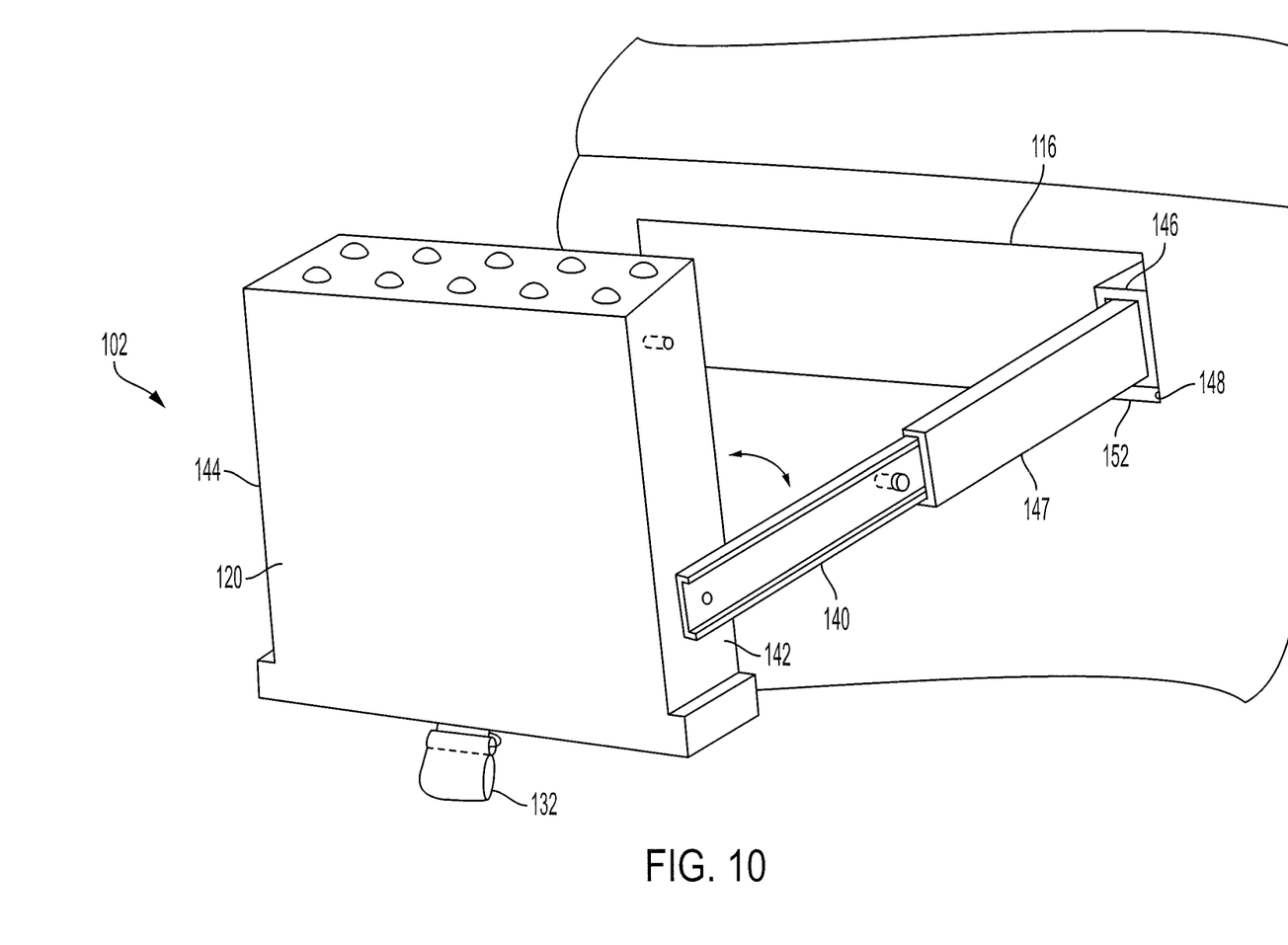
FIG. 10 illustrates a close-up perspective view of the roof access device shown in FIG. 2 in an extended position according to an aspect of the present disclosure.

FIG. 10 illustrates a close-up perspective view of the roof access device 102 shown in an extended position according to an aspect of the present disclosure. The roof access device 102 may resemble the roof access device 102 shown in FIGS. 6-9, except having a sliding mechanism with two tracks, one within another, and a tab 132 to pull and slide the step 120 from the housing 116. The sliding mechanism may have a set of first tracks 146, one attached to the left wall 148 and one attached to the right wall 150 (see FIG. 4) of the housing 116. The sliding mechanism may have a set of second tracks 147. Each of the second tracks 147 may be slidably engageable with each of the first tracks 146. The second tracks 147 may be slidably engageable with the rails 140 attached to each of the left and right sides 142, 144 of the step 120. The second tracks 147 may extend out of the housing 116 through the open end 152 when the step 120 is in an extended position. The second tracks 147 may allow for the step 120 to be extended out further away from the seat 110.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An apparatus for enabling a user to access a roof of a vehicle, the apparatus being positioned within a slot located in a seat of the vehicle, the apparatus comprising:
   a housing having an open end, a left wall, and a right wall, the housing defining the slot the slot facing a door of the vehicle;
   a left track and a right track, the left track extending along a length of the left wall and the right track extending along a length of the right wall; and
   a plate having proximal end, a left side surface, a left rail extending along a length of the left side surface, a right side surface, a right rail extending along a length of the right side surface, and a stepping surface, the left rail being slidably engaged with the left track and the right rail being slidably engaged with the right track, the plate movable between
      a stored position where the plate is positioned within the slot, and
      an extended position where the proximal end extends out of the vehicle from a frame of the door and the stepping surface is configured to be horizontal to allow the user to place the user's foot on the stepping surface for accessing the roof.

2. The apparatus of claim 1 wherein the sliding of the left and right rails on the left and right tracks is actuated by a motor.

3. The apparatus of claim 1 wherein the proximal end has a notch sized and shaped to fit a finger or a tab to sized and shaped to engage with a finger to allow the user's finger to move the plate between the stored position and the extended position.

4. The apparatus of claim 1 wherein the stepping surface is a rubber pad to allow the user's foot to have an improved grip.

5. The apparatus of claim 4 wherein the rubber pad has a plurality of protrusions to allow the user's foot to have an improved grip.

6. The apparatus of claim 1 wherein the open end of the housing is coverable with a cover in the stored position.

7. The apparatus of claim 1 wherein the left and right tracks are outer tracks, further comprising left and right inner tracks slidably engaged with the left and right outer tracks and the left and right rails, the left and right inner tracks extending out of the slot in the extended position to increase the distance between the proximal end and the open end.

8. An apparatus for enabling a user to access a roof of a vehicle, the apparatus being positioned within a slot located in a seat of the vehicle, the apparatus comprising:
- a housing having an open end, a left wall, and a right wall, the housing defining the slot;
- a left track and a right track, the left track extending along a length of the left wall and the right track extending along a length of the right wall;
- a left rail and a right rail, the left rail being slidably engaged with the left track and the right rail being slidably engaged with the right track, the left and right rails being configured to slide out of the open end; and
- a plate having a proximal end, a distal end, a left side surface, a right side surface, and a top surface, the plate being rotatably attached to the left rail from the left side surface and the right rail from the right side surface, the plate movable between
  - a stored position where the plate is positioned within the slot,
  - a first extended position where the proximal end extends out of the vehicle and the top surface is configured to be horizontal to allow the user to place the user's foot on the top surface for accessing the roof, and
  - a second extended position where the plate is rotated about the left and right rails such that the distal end faces up and is horizontal to allow the user to place the user's foot on the distal end for accessing the roof at an increased elevation relative to the first extended position.

9. The apparatus of claim 8 wherein the sliding of the left and right rails on the left and right tracks is actuated by a motor.

10. The apparatus of claim 8 wherein the rotation of the plate from the first extended position to the second extended position is actuated by a motor.

11. The apparatus of claim 8 wherein the proximal end has a notch sized and shaped to fit a finger or a tab to sized and shaped to engage with a finger to allow the user's finger to move the plate between the stored position and the first extended position.

12. The apparatus of claim 8 wherein the top surface is a rubber pad to allow the user's foot to have an improved grip in the first extended position.

13. The apparatus of claim 12 wherein the rubber pad has a plurality of protrusions to allow the user's foot to have an improved grip in the first extended position.

14. The apparatus of claim 8 wherein the distal end has a rubber pad to allow the user's foot to have an improved grip in the second extended position.

15. The apparatus of claim 14 wherein the rubber pad has a plurality of protrusions to allow the user's foot to have an improved grip in the second extended position.

16. The apparatus of claim 8 wherein the open end of the housing is coverable with a cover in the stored position.

17. The apparatus of claim 8 wherein the left and right tracks are outer tracks, further comprising left and right inner tracks slidably engaged with the left and right outer tracks and the left and right rails, the left and right inner tracks extending out of the slot in the first and second extended positions to increase the distance between the proximal end and the open end.

18. A method of using an apparatus for enabling a user to access a roof of a vehicle, the method comprising:
- pulling a plate out of a housing defining a slot located in a seat of the vehicle and facing a door of the vehicle by sliding left and right rails attached to left and right side surfaces of the plate on left and right tracks extending along lengths of left and right walls of the housing; and
- extending the plate out of the vehicle from a frame of the door such that a top surface of the plate is horizontal to allow the user to place the user's foot on the top surface for accessing the roof.

19. The method of claim 18 further comprising rotating the plate about the left and right rails such that a distal end of the plate faces up and is horizontal to allow the user to place the user's foot on the distal end for accessing the roof, thereby increasing elevation of the user from when the top surface is horizontal.

20. The method of claim 18 wherein pulling the plate includes engaging the user's finger with a notch or a tab on the proximal end.

* * * * *